(No Model.)
F. KAISER.
AMMONIA STILL.
No. 442,625. Patented Dec. 16, 1890.
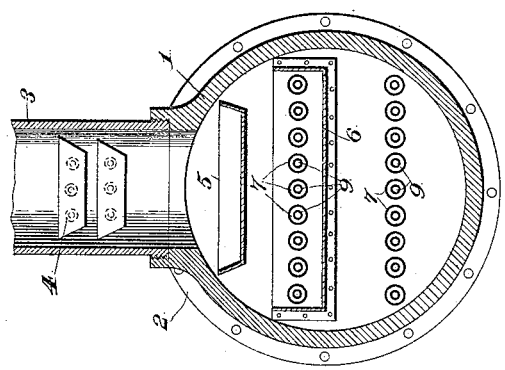
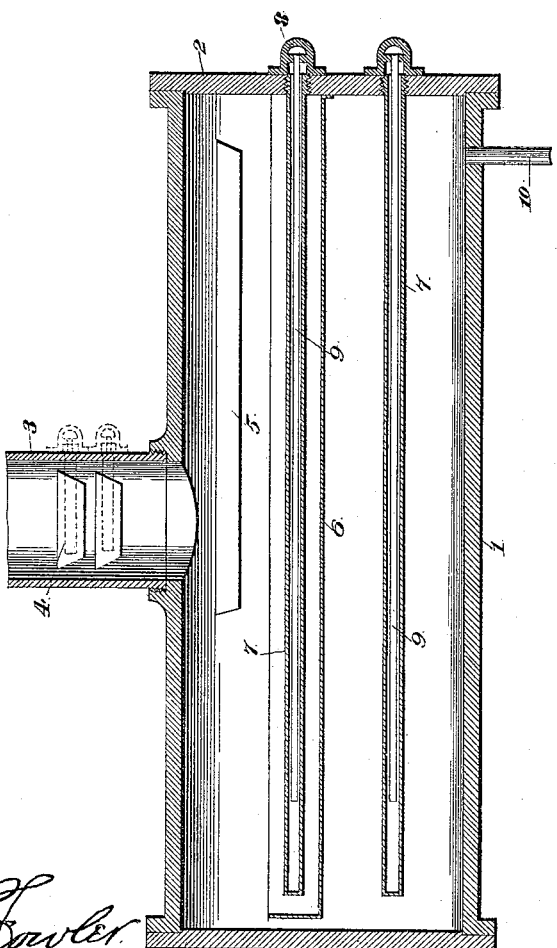
Witnesses
M. E. Fowler.
Wm. Bagger.
Inventor
Fredrick Kaiser
By his Attorneys,
C. A. Snow & Co.

UNITED STATES PATENT OFFICE.

FREDRICK KAISER, OF KNOXVILLE, TENNESSEE.

AMMONIA-STILL.

SPECIFICATION forming part of Letters Patent No. 442,625, dated December 16, 1890.

Application filed October 4, 1890. Serial No. 367,069. (No model.)

*To all whom it may concern:*

Be it known that I, FREDRICK KAISER, a citizen of the United States, residing at Knoxville, in the county of Knox and State of Tennessee, have invented a new and useful Still or Generator for Separating Anhydrous from Aqueous Ammonia, of which the following is a specification.

This invention relates to an improved still or generator for separating anhydrous ammonia from aqueous ammonia by heat; and it has for its object to construct a device of this class which shall be simple, durable, and efcient in operation.

With these ends in view the invention consists in the improved construction, arrangement, and combination of parts, which will be hereinafter fully described, and particularly pointed out in the claims.

In the drawings hereto annexed, Figure 1 is a longitudinal vertical sectional view of my improved still or generator. Fig. 2 is a vertical transverse sectional view of the same.

Like numerals of reference indicate like parts in both figures.

The body of my improved still or generator is composed of a cylindrical tank 1, having heads or ends 2 2, which are suitably bolted or otherwise secured to the ends of the said tank. The latter is provided with an upwardly-extending pipe 3, which serves as an inlet for the aqueous ammonia, and which also serves as an outlet through which the anhydrous ammonia may pass in the form of vapor to a condenser. In the pipe 3 is arranged an evaporating-pan 4, into which the aqueous ammonia is first discharged, and from which it passes by overflowing into a converting pan or funnel 5, which is arranged horizontally within the tank 1, to the front end of which latter it nearly extends. Two or more evaporating-pans—such as 4—may be arranged in the pipe 3, and each of the said evaporating-pans is to be heated by means of suitably-arranged steam-pipes, as shown in the drawings in dotted lines.

Suitably arranged in a horizontal position within the tank or casing 1 is one or more pans 6, through each of which are extended a series of heating-pipes 7. The latter are connected with suitable couplings 8 at the front end of the tank, and steam-supply pipes 9 are extended through the said heating-pipes, the supply-pipes 9 being open at their inner ends for the passage of steam into and through the heating-pipes 7. The supply-pipes 9 are connected with a suitable source of supply of steam. Of the pans 6 any desired number may be used, the said pans being arranged one above another.

In the drawings annexed only a single heating-pan has been shown; but, as stated, any desired number may be employed.

Below the lowermost heating-pan or evaporating-pan I arrange an additional row of heating-pipes 7, through which steam-supply pipes 9 are extended.

The bottom of the tank is provided with an escape-pipe 10, through which the weak ammonia-water may escape.

The operation of the invention is as follows: The aqueous ammonia is introduced through the pipe 3, and passes into the evaporating-pans 4, from whence it overflows into the funnel or conducting-pan 5. From the latter an overflow takes place into the uppermost vessel 6, through which heating-pipes are extended, as set forth. The anhydrous ammonia, which is more volatile than water, is evaporated and passes in the form of vapor through the pipe 3 to a condenser. The heavier and less volatile particles sink to the bottom and escape through the outlet 10. It is obvious that the efficiency of the apparatus may be increased by increasing the number of evaporating-pans 6.

In devices of this class it has heretofore been customary to evaporate the anhydrous ammonia by steam passing through continuous steam coils. This has been objectionable on account of the danger of rupture to which such continuous steam-coils have been subjected.

By my improvement the heating-pipes in the several evaporating-vessels are separate from each other, and there is consequently no danger of rupture by expansion or contraction.

Having thus described my invention, I claim and desire to secure by Letters Patent of the United States—

1. In a still or generator for separating anhydrous from aqueous ammonia, the combination of a tank or casing having a vertical inlet within which one or more evaporating-pans are placed, a conducting pan or funnel arranged below said inlet, and evaporating-vessels disposed below the said conducting pan or funnel and having the heating-pipes provided with interiorly-arranged steam-supply pipes, substantially as and for the purpose set forth.

2. In a still or generator for separating anhydrous from aqueous ammonia, the combination of a tank or casing having a vertically-arranged inlet-pipe, the condensing-pans arranged within the latter, a funnel or conducting-pan disposed below the said inlet-pipe, and one or more horizontally-arranged evaporating pans or vessels arranged below the funnel or conducting-pan and having heating-pipes provided with interiorly-arranged steam-pipes connected with a suitable source of supply of steam, substantially as set forth.

3. In a still or generator for separating anhydrous from aqueous ammonia, the combination of a tank having a vertically-arranged pipe for the admission of aqueous ammonia and for the escape of vaporized anhydrous ammonia, a conducting pan or funnel arranged below the said pipe, one or more evaporating pans or vessels disposed below the said funnel or conducting-pan, and the heating-pipes having interiorly-arranged steam-supply pipes open at their inner ends, substantially as and for the purpose set forth.

4. In a still or generator for separating anhydrous from aqueous ammonia, the tank or vessel having the overflow-pans provided with heating-pipes and steam-supply pipes extended longitudinally through said heating-pipes and open at their inner ends, said tank or vessel being provided with an inlet-pipe for aqueous ammonia, serving also as an escape-pipe for vaporized anhydrous ammonia to a condenser, and a downwardly-extending escape-pipe for the weak aqueous ammonia, substantially as and for the purpose set forth.

In testimony that I claim the foregoing as my own I have hereto affixed my signature in presence of two witnesses.

FREDRICK KAISER.

Witnesses:
J. B. SCHWARS,
P. J. McCARTHY.